May 25, 1965     W. A. LITTLE ETAL     3,184,823

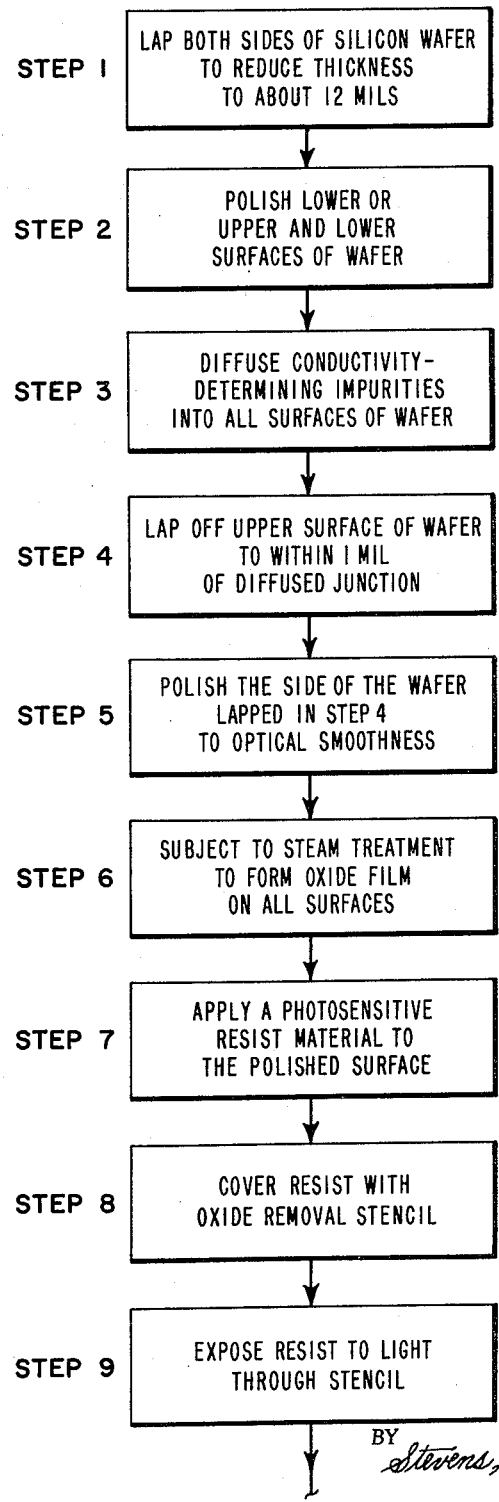

METHOD OF MAKING SILICON TRANSISTORS

Filed Sept. 9, 1960

INVENTORS
William A. Little
Stacy B. Watelski

May 25, 1965 W. A. LITTLE ETAL 3,184,823
METHOD OF MAKING SILICON TRANSISTORS
Filed Sept. 9, 1960 6 Sheets-Sheet 4

INVENTORS
William A. Little
Stacy B. Watelski
BY Stevens, Davis, Miller & Mosher
ATTORNEYS

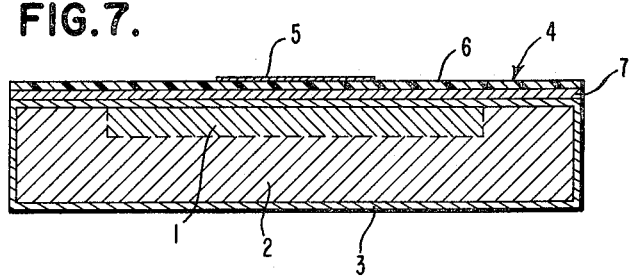
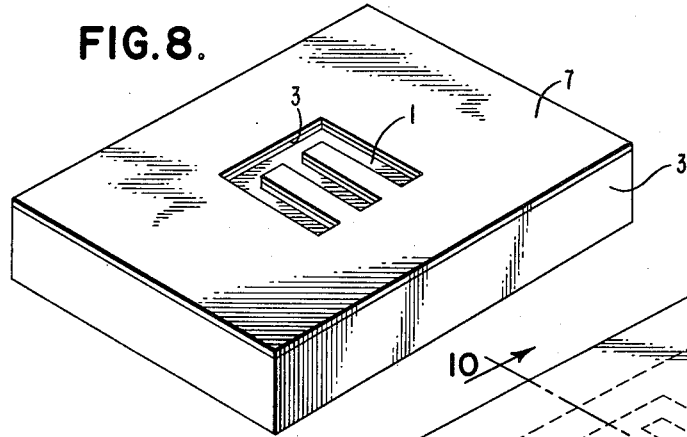
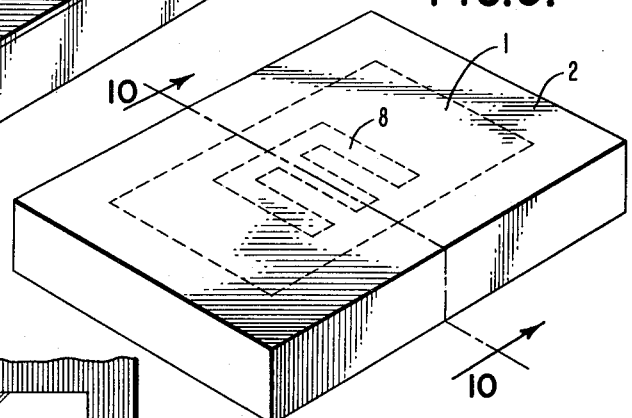
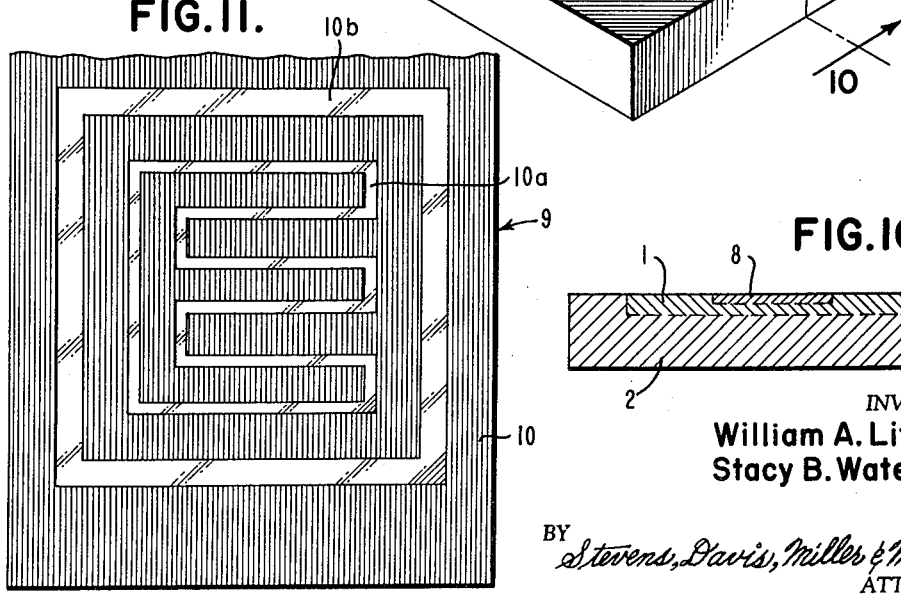
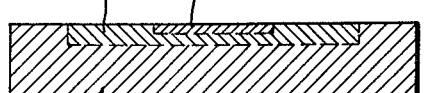
INVENTORS
William A. Little
Stacy B. Watelski INVENTORS
William A. Little
Stacy B. Watelski 3,184,823
METHOD OF MAKING SILICON TRANSISTORS
William A. Little, Richardson, and Stacy B. Watelski, Dallas, Tex., assignors to Texas Instruments Incorporated, Dallas, Tex., a corporation of Delaware
Filed Sept. 9, 1960, Ser. No. 55,036
5 Claims. (Cl. 29—25.3)

This invention relates to semiconductor devices. More particularly, this invention relates to a method of fabricating novel high-current transistors.

The requirement of high-current carrying capability in power transistors has led to increased experimentation and research in the semiconductor fabrication field in an effort to develop devices which can carry high currents and which display improved emitter injection efficiency and lower collector saturation resistance. Recent investigations have demonstrated that the electronic characteristics of semiconductor devices are very strongly dependent upon conditions existing at the surface of the semiconductor material. In junction devices, the protection of the exposed portion of the rectifying barrier where it intersects the surface of the water is especially important.

It is now understood that the base-emitter junction at its intersection with the wafer surface is rather critically related to the performance of a transistor device, and particularly to the current-carrying and internal-power dissipation characteristics displayed by such devices. Thus, the current-carrying capacity of a transistor is related to the length of this junction at its intersection with the surface in that the junction length effects the injection of minority carriers from the emitter into the base region.

Accordingly to the method of the present invention, a high-current transistor having a diffused collector region and a diffused emitter region is produced. By the selection of an appropriate geometrical configuration for the emitter, a long base-emitter junction is obtained from a relatively small emitter area. As explained above, the long base-emitter junction imparts to the transistor a greater current-carrying capacity, and the base-emitter junction capacity is low because of the small emitter area. The small emitter area also allows a device of small physical size to be constructed.

The transistor of the present invention features a diffused collector region of very low resistivity, thereby effectively lowering the saturation resistance of the transistor. The desirable grading of the base-collector junction is still present although the grading exists within the base layer rather than in the collector region as in most transistors of the prior art.

Still another very desirable feature of the present invention is that all exposed portions of both the base-collector and the base-emitter junctions are in the upper surface of the wafer. It is considered desirable to have the base-collector junction located on the upper surface of the die rather than on the side, as there is considerably less danger of contaminating the junction or completely shorting it either at the time the wafer is alloyed to the header or during one of the many etching processes.

A feature of the novel transistor of the present invention is that it has relatively soft metal contacts to nickel-plated base, emitter, and collector regions. These contacts may be applied simultaneously, this avoiding the problem of weakening one contact upon the subsequent bonding of others. The simultaneous bonding of these soft metal contacts to the base, emitter and collector regions is made possible by a property of an indium-containing alloy, sold by the Indium Corporation of America, Utica, N.Y., under the trade name, "Indalloy," which causes it to wet and adhere to the nickel plated upon these regions, but not the semiconductive wafer material. Thus, one layer of Indalloy may be applied in a continuous layer over the base-emitter surface, and another layer over the collector surface of the wafer; then both layers are cured in place. The alloy adheres to the nickel plate, but not the semiconductor material, and thus leaves the junctions free of contact material.

Broadly, the process employed in the present invention comprises forming the collector region of the transistor by diffusion of appropriate impurities into a body of semiconductor material, masking the base region except for a centrally located, multi-armed area, then forming the emitter by diffusion of conductivity-determining impurities into the exposed base region, nickel plating over the base, emitter, and collector regions, and finally, providing Indalloy contacts to these regions.

It is an object of the present invention to provide a transistor having a long base-emitter junction and, therefore, increased current-carrying capabilities.

Another object of this invention is to provide a fabrication process for semiconductor devices, which process is characterized by the simultaneous establishment of contacts to be base, emitter, and collector regions of the semiconductor element.

A further object of the present invention is the provision of a transistor characterized by a relatively low collector-saturation resistance.

An additional object of this invention is to provide a transistor having an emitter of relatively small area whereby the transistor is characterized by high-frequency response and small size.

Still another object of this invention is to provide a transistor in which all exposed active junctions are located in one relatively protected surface.

Still a further object of the present invention is to provide a novel method for fabricating transistors by utilizing photolithographic techniques.

The manner in which the foregoing and other objects and advantages of this invention may best be achieved will be understood from a consideration of the following detailed description of a preferred embodiment thereof considered in conjunction with the accompanying drawings in which:

FIGURES 1a, 1b, and 1c depict in sequence a flow or operation diagram illustrating the fabrication method of the present invention;

FIGURE 7 is a view in section of the wafer depicted in FIGURE 6 taken along line 7—7;

FIGURE 8 is a perspective view illustrating the appearance of the upper surface of the wafer following the removal of the unexposed portion of the resist and the underlying oxide film;

FIGURE 9 is a perspective view illustrating the wafer as it appears following the diffusion of appropriate conductivity-determining impurities into the exposed base region and the subsequent removal of the developed portion of the resist and the oxide film from the upper surface of the wafer;

FIGURE 10 is a section through the wafer depicted in FIGURE 9 taken along line 10—10;

FIGURE 11 is a plan view of a mask or stencil employed in conjunction with a photosensitive resist to form protective bands of resist over the base-emitter and base-collector junctions;

Figure 1B:
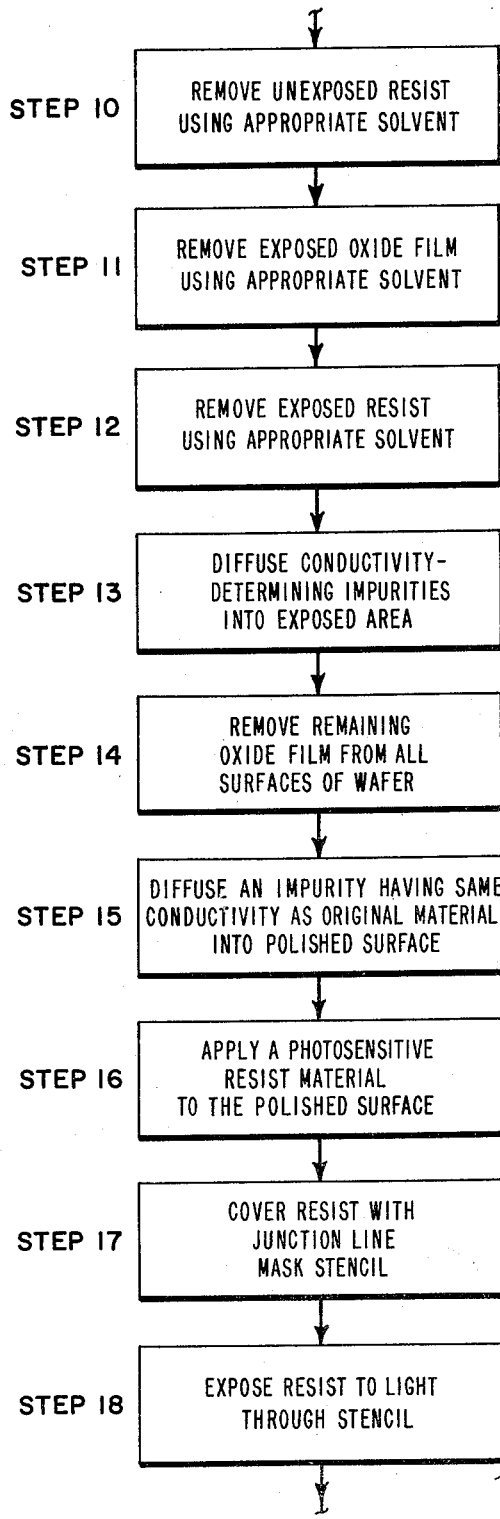
Figure 1C:
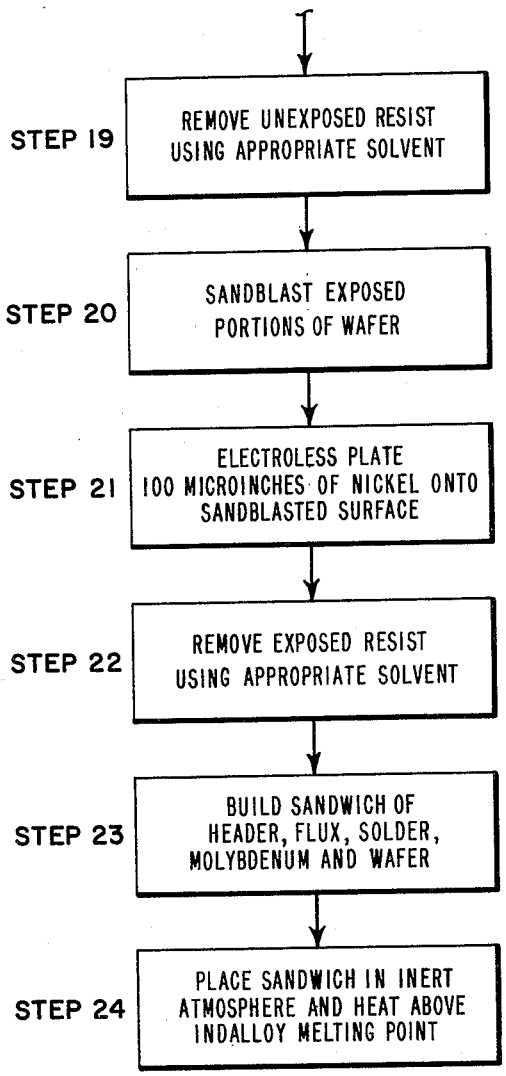

Referring now to the figures, the steps of the fabrication process of the present invention are graphically illustrated in the flow or operational diagram of FIGURE 1. In describing the method of this invention, reference will be made to the several figures following FIGURE 1 in conjunction with the appropriate step of the process as it is set forth sequentially in FIGURE 1.

At the outset of the process, a silicon block or wafer is lapped on both sides until a wafer of approximately 12 mils thickness remains. The silicon may be of either N- or P-type, but for purposes of describing the invention, it will be assumed that the method is being carried out using silicon of P-type conductivity. The resistivity of the silicon wafer is chosen to provide a desired base resistivity.

Figure 2:
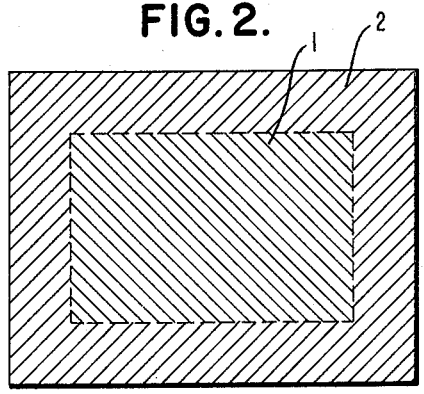
FIGURE 2 is a view, in section, of the semiconductor wafer as it appears at step 3 of the fabrication process following the initial lapping, polishing, and the diffusion of conductivity-determining impurities into all the surfaces of the wafer.

After the wafer has been reduced by lapping to a thickness of approximately 12 mils, either the lower surface or both the upper and lower surfaces of the wafer are optically polished. The collector region of the semiconductor device to be fabricated is then formed by the diffusion of N-type impurities into the silicon wafer at each of its surfaces. The diffusion is controlled so that the conductivity-determining impurities reach a depth of about 2 to 4 mils in the silicon body. At this point in the process, the semiconductor wafer appears as it is shown in FIGURE 2. There, the P-type silicon which is to form the base region of the final semiconductor device is depicted at 1. The collector region formed by diffusion of N-type impurities into the silicon is depicted at 2 in the form of a diffused surface layer which completely surrounds the remaining P-type material.

Figure 3:
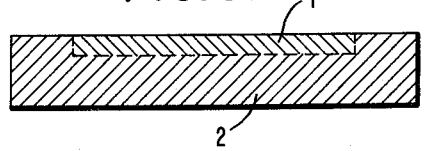
FIGURE 3 is a sectional view through the center of the wafer after one surface has been lapped away to expose the base region of the semiconductor wafer.

Following the formation of the collector region, the upper surface of the wafer is again lapped, thereby reducing the thickness of the wafer to the extent that approximately 1 mil of P-type silicon remains between the upper surface of the wafer and the P-N diffused junction formed between the base and collector regions. A view in section of the wafer, as it appears following this lapping step, is depicted in FIGURE 3.

At this stage of the process, the collector and base regions of the semiconductor device have been formed in substantially the arrangement which they will assume in the final device. The exposed portion of the base-collector junction is in the upper surface, rather than the side of the wafer. The next steps of the process are therefore directed to the location and formation of the novel multi-armed emitter region of the semiconductor device. First, the side of the wafer which was lapped in step 4 of the process, as diagrammed in FIGURE 1, is polished to optical smoothness. Extreme care should be exercised in all phases of the polishing and lapping to avoid scratching the surface.

After the polishing has been completed, an oxide film is formed on all surfaces of the wafer by subjecting the wafer to a steam treatment. As will be appreciated by those skilled in the art, the $SiO_2$ layer produced by heating silicon in an oxidizing atmosphere will mask the wafer against many of the commonly-used diffusants, including the phosphorous used in the specific example of the present process.

Figure 4:
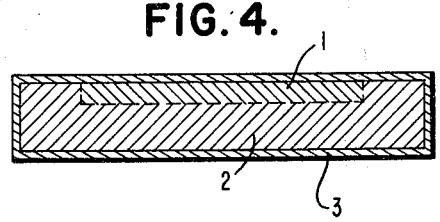
FIGURE 4 is a sectional view similar to FIGURE 3 illustrating the appearance of the wafer following steam treatment to form an oxide film on each of its surfaces.

When the wafer has been subjected to the steam treatment to form the oxide film on all its surfaces, it appears in cross section, as shown in FIGURE 4. In this figure, the base region is again designated by the numeral 1, the diffused collector region is shown at 2, and the oxide film is depicted at 3.

Figure 5:
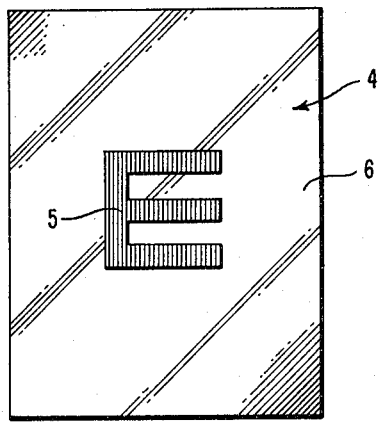
FIGURE 5 illustrates the mask or stencil which is to be employed in conjunction with a photosensitive material to provide for selective removal of the oxide film according to a predetermined pattern.
Figure 6:
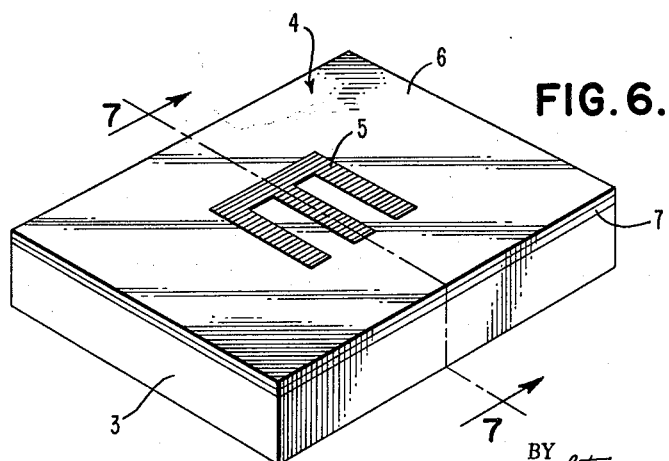
FIGURE 6 is a perspective view of the wafer shown in FIGURE 4 with the photosensitive resist material applied to the upper surface thereof and the mask or stencil depicted in FIGURE 5 superimposed over the photosensitive resist.

The oxidized wafer is next coated on its upper surface with a thin uniform coating of photosensitive material, such as Kodak Photographic Resist (KPR), manufactured by Eastman Kodak Company. After coating the surface with the resist and allowing it to dry, a mask or stencil, as shown in FIGURE 5, is applied to the upper surface of the semiconductor wafer over the resist. In the preferred embodiment of the invention being described for purposes of illustration, stencil 4 carries in a centrally coated position an opaque E-shaped indicia 5. The remaining portion of the mask 4 is a clear, transparent material 6. When the resist and stencil have been superimposed upon the wafer, the assembly appears as shown in FIGURE 6 where the thin uniform coating of resist is designated by the numeral 7. It will be perceived that the darkly colored E-shaped indicia 5 is located on the upper surface of the wafer and overlies, and is centrally disposed upon the base region of the wafer. This may perhaps best be observed by reference to FIGURE 7 which is a view in section through the wafer depicted in FIGURE 6 taken along the line 7—7. The section line has been taken through the center arm of the E-shaped indicia so that the relative location of the E-shaped indicia 5 to the base region 1 may be clearly seen.

The upper surface of the stencil is now subjected to appropriate lighting so that the photographic resist is exposed throughout, except for that portion which underlies the dark E of the mask or stencil. Care should be exercised, if Eastman KPR resist is employed, to avoid pre-exposing the layer of resist to daylight, since this material is highly sensitive to ultraviolet radiation.

After exposing the resist, the undeveloped resist is removed by dissolving it in an appropriate solvent which does not attack or dissolve the exposed portion of the resist. In the case of KPR, a solvent called KPR developer which is supplied by the Eastman Kodak Company may be used. In this manner, when the wafer is subjected to washing with the selective solvent described, the unexposed E-shaped portion of the resist is removed in solution while the exposed resist which surrounds the E or the top surface of the wafer remains at a thin protective coating.

The effect of the masking technique thus far is to leave exposed an E-shaped area of the oxide film overlying the upper surface of the wafer while masking the remaining portion of said film on that surface. With the wafer in this condition, a dilute hydrofluoric acid etch is applied to the upper surface of the wafer, and the exposed oxide film is dissolved therein. The wafer then appears as shown in FIGURE 8. After rinsing away the residual etchant, the exposed portion of the KPR is removed by dissolving it in methylene chloride or other appropriate solvent (step 12 in FIGURE 1).

The wafer is now ready for the formation of the emitter region by diffusion of appropirate impurities into the upper surface of the base region. The condition of the upper surface of the wafer is such that all of the surface is protected against penetration of the diffusant by the thin oxide film which covers it, except for the E-shaped portion of the base region, which is exposed. Since the silicon forming the base region is of P-type conductivity, the conductivity-determining impurity which is selected for diffusion into the base region to form the emitter must be of N-type material, and must be a diffusant which will not penetrate the oxide film. Phosphorus has been found to be an especially appropriate material for this purpose. In this preferred example, the emitter is formed by diffusing phosphorus from a phosphorous pentoxide source into the exposed base region at a temperature of approximately 1200° C. for a sufficient time to permit its penetration to a depth of approximately 0.1 mil. The wafer is then subjected to an appropriate clean-up treatment to remove the oxide film from all surfaces. Following the clean-up, the wafer appears as shown in FIGURE 9 wherein the base, collector and emitter regions are depicted at 1, 2, and 8, respectively. A section through the wafer of FIGURE 9, taken along the line 10—10, is shown in FIGURE 10.

In order to enhance the P-conductivity of the base region and improve the ohmic contact which is subsequently to be bonded thereon, a follow-up diffusion of P-type gallium into the entire base-emitter surface of the wafer is then carried out. The diffusion of the gallium is carried out at 1200° C. and during this step, the phosphorus which was diffused into the base to form the emitter region is diffused an additional 0.2 mil to 0.3 mil into the silicon wafer. The concentration of gallium in the emitter region is not sufficient to alter its N-type conductivity attributable to the diffused phosphorus.

The next steps of the process commencing with step 16, depicted in FIGURE 1, are directed to the preparation of the wafer for the selective application of a thin coating of nickel. Although considerably more difficulty is generally experienced in plating upon silicon than upon germanium, a coating of nickel may be applied to the surface of the silicon by the employment of known electroless plating process which forms a very adherent and uniform plating over the entire surface reached by the electroless solution. The electroless technique is particularly well suited for plating semiconductor surfaces for the purpose of obtaining electrical contact thereto.

Prior to the application of the nickel coating, however, it is necessary to provide some means for protecting the junctions of the semiconductor device to prevent short-circuiting by the nickel plating. This is accomplished by a masking technique similar to that employed in forming the emitter region.

Figure 12:
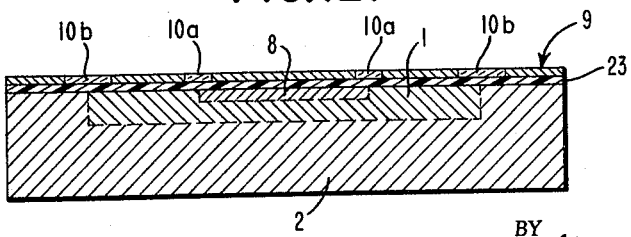
FIGURE 12 is a section taken through the center of a wafer which has been coated with a photosensitive material and having the stencil of FIGURE 11 overlying the photosensitive material.

Initially, the wafer is again coated with KPR. After the KPR has been applied to the entire surface of the element and allowed to dry a junction line mask or stencil of the type depicted in FIGURE 11 is placed over the lacquer. By reference to FIGURE 11, it will be perceived that the junction line stencil consists of an opaque sheet 10 having a centrally located band 10a of clear transparent material. The band 10a forms the outline of a block E and conforms to the junction between E-shaped emitter region 8 and the base region 1. This band is approximately 5 mils wide, and when the mask 9 is superimposed on the upper surface of the semiconductor wafer, the transparent band 10a overlies or straddles the base-emitter junction so that it extends a distance of approximately 2.5 mils on either side of the junction. This relationship is illustrated in FIGURE 12.

The mask 9 includes a second band 10b of clear transparent material. The band 10b is square in shape and conforms to the junction between the base region 1 and the collector region 2. Band 10b is approximately 15 mils wide, and when the mask 9 is superimposed upon the upper surface of the semiconductor wafer, the band 10b overlies or straddles the base-collector junction, as shown in FIGURE 12. The band 10b is considerably wider than the band 10a. This is desirable, as the base-collector junction is not so precisely located on the surface of the wafer as the base-emitter junction.

Figure 13:
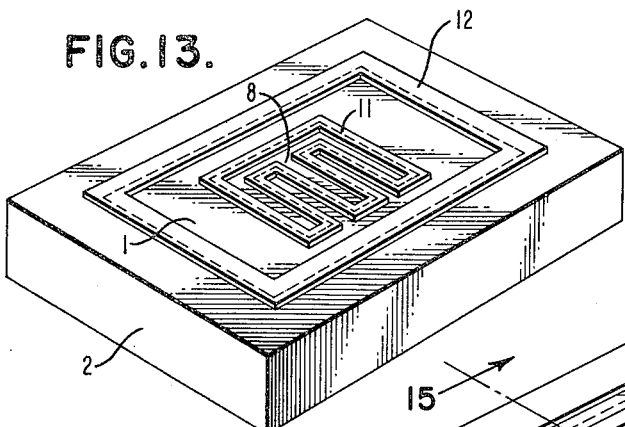
FIGURE 13 is a perspective view of the wafer as it appears following the formation of the protective band of developed photosensitive resist over the base-emitter and base-collector junctions.

With the KPR coating 23 applied and the junction line mask in place, the KPR is again exposed in a manner similar to that used in forming the emitter region in step 9 of FIGURE 1a. Since the small narrow bands 10a and 10b are the only portions of the mask or stencil which are transparent, the portion of the KPR which underlies these bands will be the only portion of the KPR which is exposed. The unexposed portion of the KPR is removed in KPR developer or other appropriate solvent. The wafer now appears, as shown in FIGURE 13, where the narrow band of developed KPR 11 is shown overlying the junction between the base 1 and emitter regioin 8 and the band 12 of KPR overlies the base-collector junction.

Figure 14:
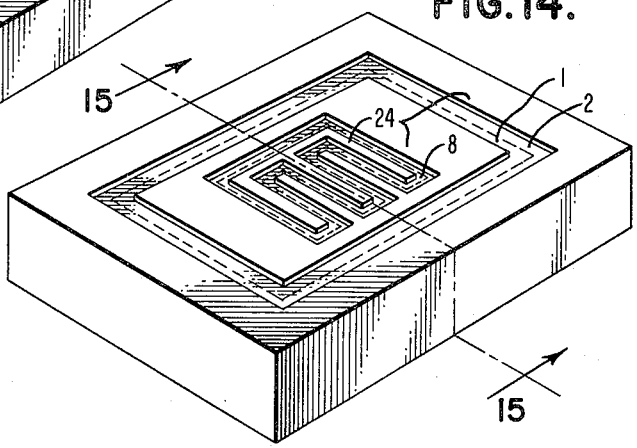
FIGURE 14 illustrates the appearance of the wafer after a coating of nickel has been formed upon the wafer.
Figure 15:
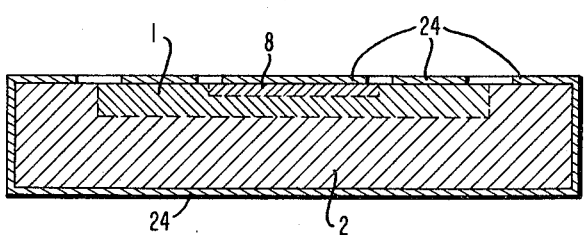
FIGURE 15 is a view in section of the wafer depicted in FIGURE 14 taken along lines 15—15.

Prior to the electroless application of the nickel coating to the upper surface of the wafer, it is necessary to roughen this surface to enhance the adherence of the nickel coating. To this end, the wafer is sandblasted lightly in order to roughen the surface while avoiding the removal of the KPR mask overlying the base-emitter and base-collector junctions. Following the roughening of the surface of the wafer by sandblasting, approximately 100 microinches of nickel 24 are deposited upon the wafer surface by an electroless nickel-plating technique. As shown in FIGURE 14, the nickel is not plated over the junctions.

In some instances, such as when the wafers are not of uniform size or are of irregular shape, it will not be possible to mask the base-collector junction with the photoresist. In this instance, the mask 9 will not include the transparent band 10b, and the thin layer of nickel will cover the base-collector junction. It is therefore necessary to free the base-collector junction from the nickel plating 24 to prevent the short circuiting of this junction which would otherwise result. To accomplish this, all of the lower surface and upper surface except a five to ten mil wide perimeter extending around the edge of the upper surface is masked with an etch-resistant wax. From the geometry of the collector region, as it has been depicted in FIGURES 3, 9 and 12, it will be understood that the sides of the wafer and that part of the upper surface containing the collector region and the portion of the base region which is adjacent the base-collector junction will be free of the wax masking. A suitable etchant, such as nitric acid, may then be used to remove the thin layer of nickel from the unmasked regions, including that which overlies the base-collector junction.

After the nickel has been etched away from the unmasked regions, the element is cleaned up, utilizing a CP-4 etch. The wax mask is then removed from both surfaces using a suitable solvent, such as trichloroethylene, and the protective resist 11 is removed to expose the base-emitter junction.

As mentioned before, it is extremely difficult to produce a nickel plate which will adhere strongly to the silicon surface. In some instances, it is desirable to perform the plating operation in two steps. Thus, a thin layer of nickel is plated onto the wafer in the manner described above. The nickel-plated wafer is then placed in a furnace, and the thin layer of nickel plate is sintered into the silicon wafer. Sintering at 700° C. for one hour in a nitrogen atmosphere has provided acceptable results. The wafer is again masked with the photoresist to protect the junctions, and a second layer of nickel is applied using the electroless nickel-plating process. Contacts formed in this manner are appreciably stronger than those formed without the sintering operation.

In order to make it easier to attach leads to the surfaces of the wafer, a layer of solder is next applied to the base-emitter surface and to the collector surface. A suitable solder must readily bond to the nickel plating, its melting point must be above the maximum operating temperature of the device, and must be etch resistant. As has been previously indicated, Indalloy, the trade name of a metallic alloy of indium manufactured by the Indium Corporation of America, Utica, New York, has proved to be an excellent material for this purpose. Indalloy is first placed on the upper and lower surfaces of the wafer over the nickel plating, and the wafer is then placed in an inert atmosphere and heated above the melting point of the Indalloy. The liquid Indalloy will wet the nickel surfaces and leave the base-collector and base-emitter junctions free and clean.

Figure 16:
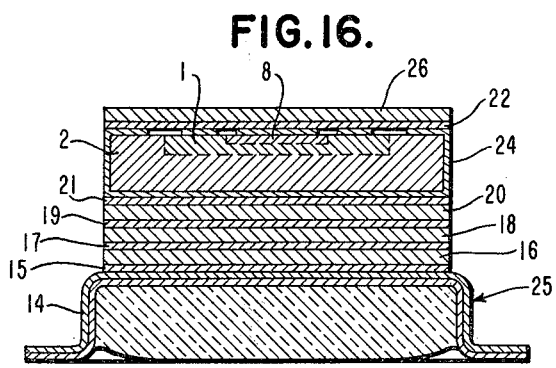
FIGURE 16 is a view in elevation of the semiconductor element of the present invention mounted upon a header by the use of the novel sandwich-type bond which constitutes a feature of the present invention.

Instead of first applying the Indalloy to the wafer and then bonding the wafer to the header, the semiconductor element may be mounted upon a header by the employment of the sandwich-type bond of the present invention. The manner in which this bond is built up may best be perceived by reference to FIGURE 16 where the semiconductor element is shown bonded collector side down to a gold-plated header. A layer of flux 15 is first applied to the layer 14 of gold plate which covers the header 25. Then, layers of Indalloy 16, flux 17, nickel-plated molybdenum 18, flux 19, Indalloy 20, and flux 21 are positioned upon the gold-plated header 25. The nickel-plated wafer is then added to the combination with the lower surface abutting the layer 21 of flux. Layer 22 of flux and 26 of Indalloy are placed on the base-emitter surface. The entire assembly is then placed in an inert atmosphere and heated above the melting point of the Indalloy. In this manner, the bonding of the Indalloy to the upper or emitter-base surface of the header and the bonding of the wafer to the header are simultaneously accomplished. Wire leads may later be cold-pressure bonded to the Indalloy emitter and base contacts.

A layer 18 of molybdenum is placed between the wafer and the header. The molybdenum has a coefficient of thermal expansion substantially equal to that of silicon, whereas the normal header materials do not. By mounting the wafer on the layer of molybdenum rather than directly to the header, it is possible to minimize the stresses induced in the wafer as the temperature of the unit is changed.

The novel devices fabricated by the method of the present invention have exhibited certain improved characteristics not present in devices of the prior art. First, the E-shaped or multi-armed emitter zone provides a long, extended emitter-base junction which results in greater current-carrying capacity.

The deep diffused collector region is of very low resistivity, thus effectively reducing the collector saturation resistance. In fact, the collector saturation resistance obtained with the transistor of the present invention is sufficiently low that it approaches the value of saturation resistance obtained with alloy-type transistors.

As all of the exposed portions of both the base-collector and the base-emitter junctions are located in the relatively protected upper surface of the wafer, there is considerably less danger of shorting one of the junctions and the leakage current of this transistor is considerably less than that of prior art transistors, as there is less contamination of the active junctions.

The advantages accruing from the use of Indalloy to form the base, emitter and collector contacts have been previously mentioned. The primary advantage in such use of this material stems from its property of wetting or adhering to the nickel plating without adherence to the exposed junction areas of the wafer. This makes possible the formation of all contacts and the mounting of the wafer on the header simultaneously.

Although this invention has been disclosed by means of an illustrative embodiment thereof, the invention is not intended to be limited to this embodiment and obvious modifications and innovations in the procedures and materials specified will occur to those skilled in the art, and are considered to fall within the scope of this invention. Thus, for example, the emitter region, instead of being E-shaped as described, might have an asterisk or starfish-shaped configuration, resulting in a long base-emitter junction and a relatively small emitter area. Also, in those instances wherein the emitter area is not so critical, other configurations, such as a circle, could be used.

What is claimed is:

1. The method of fabricating a high-current transistor which comprises polishing a first surface of a rectangular, parallelepiped-shaped wafer of P-type silicon, diffusing an N-type impurity material into all the surfaces of said wafer to a depth of approximately 3 mils, lapping said first surface of said wafer to reduce the thickness of the wafer to approximately 4 mils, polishing the lapped surface of the wafer, forming an oxide film on all surfaces of the wafer, applying a thin film of photosensitive material to the lapped and polished surface of said wafer, superimposing over said film a first stencil bearing a centrally located opaque E-shaped indicia, exposing portions of said photosensitive material by exposing it to light through said stencil, dissolving the undeveloped portion of said material, dissolving the E-shaped portion of the oxide film which is exposed upon said lapped and polished surface to thereby expose an E-shaped area centrally located on said lapped and polished surface, removing the developed portion of the photosensitive material, diffusing N-conductivity type phosphorous pentoxide into said exposed E-shaped area of said lapped and polished surface to a depth of approximately 0.1 mil to form the emitter region of said transistor, dissolving the portion of said oxide film remaining on the surfaces of said wafer, diffusing P-type impurity material into said lapped and polished surface, applying a thin film of photosensitive material to said polished and lapped surface, superimposing over said film a second stencil bearing a centrally located, opaque, E-shaped indicia outlined by a narrow transparent band, developing the portion of the photosensitive material underlying the transparent band by exposing it to light through said stencil, removing the unexposed photosensitive material remaining on said transistor, sandblasting said lapped and polished surface, plating approximately 100 microinches of nickel on said sandblasted surface, sandblasting a second surface of said wafer lying opposite said nickel-plated surface, plating approximately 100 microinches of nickel on said second surface, and removing the developed photosensitive material.

2. The method of fabricating a high-current transistor which comprises polishing a first surface of a rectangular, parallelepiped-shaped wafer of P-type silicon, diffusing an N-type impurity material into all the surfaces of said wafer to a depth of approximately 3 mils, lapping said first surface of said wafer to reduce the thickness of the wafer to approximately 4 mils, polishing the lapped surface of the wafer, forming an oxide film on all surfaces of the wafer, applying a thin film of photosensitive material to the lapped and polished surface of said wafer, superimposing over said film a first stencil bearing a centrally located opaque asterisk-shaped indicia, exposing portions of said photosensitive material by exposing it to light through said stencil, dissolving the undeveloped portion of said material, dissolving the asterisk-shaped portion of the oxide film which is exposed upon said lapped and polished surface to thereby expose an asterisk-shaped area centrally located on said lapped and polished surface, removing the developed portion of the photosensitive material, diffusing N-conductivity type phosphorous pentoxide into said exposed asterisk-shaped area of said lapped and polished surface to a depth of approximately 0.1 mil to form the emitter region of said transistor, dissolving the portion of said oxide film remaining on the surfaces of said wafer, diffusing P-type impurity material into said lapped and polished surface, applying a thin film of photosensitive material to said polished and lapped surface, superimposing over said film a second stencil bearing a centrally located, opaque, asterisk-shaped indicia outlined by a narrow transparent band, developing the portion of the photosensitive material underlying the transparent band by exposing it to light through said stencil, removing the unexposed photosensitive material remaining on said transistor, sandblasting said lapped and polished surface, plating approximately 100 microinches of nickel on said sandblasted surface, sandblasting a second surface of said wafer lying opposite said nickel-plated surface, plating approximately 100 microinches of nickel on said second surface, and removing the developed photosensitive material.

3. The method of fabricating a high-current transistor which comprises polishing a first surface of a rectangular, parallelepiped-shaped wafer of P-type silicon, diffusing an N-type impurity material into all the surfaces of said wafer to a depth of approximately 3 mils, lapping said first surface of said wafer to reduce the thickness of the wafer to approximately 4 mils, polishing the lapped surface of the wafer, forming an oxide film on all surfaces of the wafer, applying a thin film of photosensitive material to the lapped and polished surface of said wafer, superimposing over said film a first stencil bearing a centrally located opaque starfish-shaped indicia, exposing portions of said photosensitive material by exposing it to light through said stencil, dissolving the undeveloped portion of said material, dissolving the starfish-shaped portion of the oxide film which is exposed upon said lapped and polished surface to thereby expose a starfish-shaped area centrally located on said lapped and polished surface, removing the developed portion of the photosensitive material, diffusing N-conductivity type phosphorous pentoxide into said exposed starfish-shaped area of said lapped and polished surface to a depth of approximately 0.1 mil to form the emitter region of said transistor, dissolving the portion of said oxide film remaining on the surfaces of said wafer, diffusing P-type impurity material into said lapped and polished surface, applying a thin film of photosensitive material to said polished and lapped surface, superimposing over said film a second stencil bearing a centrally located, opaque, starfish-shaped indicia outlined by a narrow transparent band, developing the portion of the photosensitive material underlying the transparent band by exposing it to light through said stencil, removing the unexposed photosensitive material remaining on said transistor, sandblasting said lapped and polished surface, plating approximately 100 microinches of nickel on said sandblasted surface, sandblasting a second surface of said wafer lying opposite said nickel-plated surface, plating approximately 100 microinches of nickel on said second surface, and removing the developed photosensitive material.

4. A method of fabricating a silicon transistor comprising the steps of forming a thin wafer of monocrystalline silicon having a plane top surface with a diffused dished P-N junction adjacent said top surface, the P-N junction providing the collector-base junction of the transistor, the edge of the P-N junction lying wholly on said top surface and there defining an enclosed surface area, forming a thin film of silicon oxide on said top surface, applying a thin coating of photo-sensitive material to said top surface, exposing said thin coating to light through a stencil bearing a centrally located opaque indicia corresponding to the desired geometry of the emitter region of the transistor, subjecting the wafer to a solvent effective to remove the unexposed portion of said thin coating, subjecting the wafer to a solvent effective to remove the portion of the thin film of silicon oxide which underlies the area where the thin coating has been removed, diffusing a conductivity-type determining impurity material into the top surface of the wafer in the area where the thin film of silicon oxide has been removed to form adjacent said top surface another dished P-N junction which provides the emitter-base junction of the transistor, the emitter-base junction being closely adjacent a central internal portion of the collector-base junction but being spaced from said central internal portion through the wafer by a given distance, the edge of the emitter-base junction lying wholly on said top surface and there defining an enclosed surface area which is entirely within the surface area enclosed by the edge of the collector-base junction, the edge of the collector-base junction on said top surface being spaced from the edge of the emitter-base junction by much greater than said given distance to facilitate making contact to the base region of the transistor, subjecting the wafer to a solvent effective to remove the thin film of silicon oxide from the top surface of the wafer at least in the areas where base and emitter contacts are to be applied, depositing a thin coating of metal over the entire top surface of the wafer, removing the coating of metal in the areas overlying the edges of the P-N junctions to leave a base contact lying wholly within the surface area enclosed by the collector-base junction but outside the surface area enclosed by the emitter-base junction and an emitter contact lying wholly within the surface area enclosed by the emitter-base junction, the base and emitter contacts being spaced from the collector-base and emitter-base junctions, and bonding the bottom surface of the wafer to a metallic header.

5. A method of fabricating a silicon transistor comprising the steps of providing a thin wafer of monocrystalline silicon having a substantially plane top face with a diffused dished P-N junction adjacent said top face, the P-N junction providing the collector-base junction of the transistor, the edge of the P-N junction lying wholly on said top face and there defining an enclosed surface area, forming a thin film of silicon oxide on said top face at least within said enclosed surface area, applying a thin coating of photo-sensitive material to said top face, exposing said thin coating to light through a mask bearing a centrally located indicia corresponding to the desired geometry of the emitter region of the transistor, subjecting the wafer to a solvent effective to remove the unexposed portion of said thin coating, subjecting the wafer to a solvent effective to remove the portion of the thin film of silicon oxide which underlies the area where the thin coating has been removed, diffusing a conductivity-type determining impurity material into the top face of the wafer in the area where the thin film of silicon oxide has been removed to form adjacent said top face another dished P-N junction which provides the emitter-base junction of the transistor, the emitter-base junction being closely adjacent a central internal portion of the collector-base junction but being spaced from said central internal portion through the wafer by a given distance, the edge of the emitter-base junction lying wholly on said top face and there defining an enclosed surface area which is entirely within the surface area enclosed by the edge of the collector-base junction, the edge of the collector-base junction on said top face being spaced from the edge of the emitter-base junction by much greater than said given distance to facilitate making contact to the base region of the transistor, subjecing the wafer to a solvent effective to remove the thin film of silicon oxide from the top face of the wafer at least in the areas where base and emitter contacts are to engage the surface of the wafer of silicon, depositing a thin coating of metal over the top face of the wafer, removing the coating of metal in areas above the edges of the P-N junctions to separate the coating into base and emitter contacts including a base contact engaging the surface of the wafer of silicon only within the surface area enclosed by the collector-base junction but outside the surface area enclosed by the emitter-base junction and an emitter contact engaging the surface of the wafer of silicon only within the surface area enclosed by the emitter-base junction, the areas where the thin coating of metal engages the surface of the wafer of silicon to provide the base and emitter contacts being spaced from the collector-base and emitter-base junctions, and providing an electrical connection to the collector region.

References Cited by the Examiner

UNITED STATES PATENTS

| | | | |
|---|---|---|---|
| 2,721,965 | 10/55 | Hall | 317—235 |
| 2,763,822 | 9/56 | Frola et al. | 148—1.5 |
| 2,801,375 | 7/57 | Losco | 148—1.5 |
| 2,804,405 | 8/57 | Derick | 148—189 |
| 2,842,841 | 7/58 | Schnable et al. | 29—495 |
| 2,863,105 | 12/58 | Ross | 148—1.5 |
| 2,870,049 | 1/59 | Mueller et al. | 148—1.5 |
| 2,879,188 | 3/59 | Strull | 148—1.5 |
| 2,897,421 | 7/59 | Kruper | 148—1.5 |
| 2,906,647 | 9/59 | Roschen | 148—1.5 |
| 2,924,760 | 2/60 | Herlet | 317—235 |
| 2,945,296 | 7/60 | Jones et al. | 29—496 |
| 2,960,417 | 11/60 | Strother | 148—1.5 |
| 2,963,390 | 12/60 | Dickson | 148—1.5 |
| 2,981,877 | 4/61 | Noyce | 148—187 |
| 3,006,791 | 10/61 | Webster | 148—187 |
| 3,064,167 | 11/62 | Hoerni | 148—187 |
| 3,089,793 | 5/63 | Jordan | 148—189 |

OTHER REFERENCES

Aschner et al.: Journal of Electrochemical Society, May 1959, pages 417–417.

BENJAMIN HENKIN, *Primary Examiner.*

ROGER L. CAMPBELL, RAY K. WINDHAM,
*Examiners.*